(12) United States Patent
Shih (10) Patent No.: US 9,465,172 B2
(45) Date of Patent: Oct. 11, 2016

(54) OPTICAL FIBER CONNECTOR (71) Applicants: BAYCOM OPTO-ELECTRONICS TECHNOLOGY CO., LTD., Hsin-Chu (TW); FIBERON TECHNOLOGIES INC., Westborough, MA (US)

(72) Inventor: Hsi-Chung Shih, New Taipei (TW)

(73) Assignees: FIBERON TECHNOLOGIES INC., Westborough, MA (US); BAYCOM OPTO-ELECTRONICS TECHNOLOGY CO., LTD., Hsin-Chu (TW)

( * ) Notice: Subject to any disclaimer, the term of this patent is extended or adjusted under 35 U.S.C. 154(b) by 383 days.

(21) Appl. No.: 14/253,121

(22) Filed: Apr. 15, 2014

(65) Prior Publication Data

US 2016/0216458 A1    Jul. 28, 2016

(51) Int. Cl.
G02B 6/36    (2006.01)
G02B 6/38    (2006.01)

(52) U.S. Cl.
CPC ............ *G02B 6/3881* (2013.01); *G02B 6/387* (2013.01); *G02B 6/3871* (2013.01); *G02B 6/3893* (2013.01)

(58) Field of Classification Search
CPC    G02B 6/3881; G02B 6/3871; G02B 6/3893; G02B 6/3874; G02B 6/387
USPC ......................................................... 385/78
See application file for complete search history.

(56) References Cited

U.S. PATENT DOCUMENTS

| | | | | |
|---|---|---|---|---|
| 5,157,749 A * | 10/1992 | Briggs | ................. | G02B 6/3807 385/56 |
| 2001/0046355 A1* | 11/2001 | Schmatz | .............. | G02B 6/3839 385/59 |
| 2008/0253719 A1* | 10/2008 | Kachmar | ............. | G02B 6/3806 385/86 |
| 2010/0220961 A1* | 9/2010 | de Jong | ................ | G02B 6/3879 385/77 |
| 2014/0056562 A1* | 2/2014 | Limbert | .................... | G02B 6/36 385/77 |
| 2015/0177463 A1* | 6/2015 | Lee | ....................... | G02B 6/3897 385/76 |
| 2015/0205052 A1* | 7/2015 | Huang | ................... | G02B 6/387 385/71 |
| 2015/0277059 A1* | 10/2015 | Raven | .................. | G02B 6/3879 385/78 |

* cited by examiner

*Primary Examiner* — Sung Pak
(74) *Attorney, Agent, or Firm* — Occhiuti & Rohlicek LLP (57) ABSTRACT

An optical fiber connector comprises: a positioning housing that has a recessed open end; a positioning cover that is formed with at least two first grooves and at least two second grooves; and at least two terminal plugs, each of which has a plug housing and an end sleeve. The positioning cover is detachably mountable on the positioning housing between first and second positions relative to the positioning housing to cover the recessed open end. The end sleeves are respectively fitted into the first grooves when the positioning cover is disposed at the first position, and are respectively fitted into the second grooves when the positioning cover is disposed at the second position.

11 Claims, 13 Drawing Sheets

OPTICAL FIBER CONNECTOR

CROSS-REFERENCE TO RELATED APPLICATION

This application claims priority of Taiwanese Application No. 102218302, filed on Sep. 27, 2013.

BACKGROUND OF THE INVENTION

1. Field of the Invention

This invention relates to an optical fiber connector, more particularly to a duplex optical fiber connector including a positioning cover formed with a pair of first grooves and a pair of second grooves for respectively positioning end sleeves of two terminal plugs.

2. Description of the Related Art

U.S. Pat. No. 8,152,385 discloses a conventional duplex fiber optic connector for connecting optical fibers of a fiber optic cable to an adapter of a work station. The conventional duplex fiber optic connector has a switchable polarity, and includes a housing, first and second fiber optic connector assemblies that have different polarity configurations, and a removable trigger mechanism. The first and second fiber optic connector assemblies have tubular end sleeves, and are connected to and receive the optical fibers of the fiber optic cable, respectively. The housing defines a pair of parallel apertures that receive the tubular end sleeves of the first and second fiber optic connector assemblies, respectively, such that the first and second fiber optic connector assemblies are positioned in the parallel apertures and are rotatable relative to the housing for polarity reversal. The removable trigger mechanism is slidably and detachably sleeved on the housing to engage releasably the first and second fiber optic connector assemblies so as to prevent rotation of the first and second fiber optic connector assemblies relative to the housing, and in turn, undesired polarity reversal. The polarity reversal is accomplished by removing the removable trigger mechanism from the housing, followed by rotating the first and second fiber optic connector assemblies and re-installing the removable trigger mechanism on a reverse side of the housing.

Although the conventional duplex fiber optic connector can provide the polarity reversal function, it has a fixed pitch (such as a 5.25 mm pitch or a 6.25 mm pitch) between longitudinal axes of the first and second fiber optic connector assemblies that is only suitable for an adapter having a corresponding pitch, and is unable to be used for adapters with different pitches. As such, system centers, such as data communication centers, computer centers, information centers and the like, are required to store various fiber optic connectors with different pitches, which increases burden in inventory stock, storage space and associated costs.

SUMMARY OF THE INVENTION

Therefore, the object of the present invention is to provide an optical fiber connector that can overcome the aforesaid drawback associated with the prior art.

According to the present invention, there is provided an optical fiber connector adapted to be connected to at least two optical fibers. The optical fiber connector comprises: a positioning housing for extension of the optical fibers therethrough and having a recessed open end; a positioning cover having first and second axial ends and an inner side that extends between the first and second axial ends and that is formed with at least two first grooves and at least two second grooves for positioning and extension of the optical fibers therein, the first and second axial ends being opposite to each other in an axial direction, the first grooves being aligned with each other along a transverse direction transverse to the axial direction, the second grooves being aligned with each other along the transverse direction, each of the first grooves being spaced apart from and partially overlapping a corresponding one of the second grooves along the axial direction; and at least two terminal plugs, each of which has a plug housing and an end sleeve connected to the plug housing in the axial direction for sequential extension of a corresponding one of the optical fibers therethrough. The positioning cover is detachably mountable on the positioning housing between first and second positions relative to the positioning housing to cover the recessed open end of the positioning housing. When the positioning cover is disposed at the first position, the first grooves are respectively disposed between the plug housings of the terminal plugs and the second grooves along the axial direction and the end sleeves of the terminal plugs are respectively fitted into the first grooves. When the positioning cover is disposed at the second position, the second grooves are respectively disposed between the plug housings and the first grooves along the axial direction and the end sleeves are respectively fitted into the second grooves.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

Figure 1:
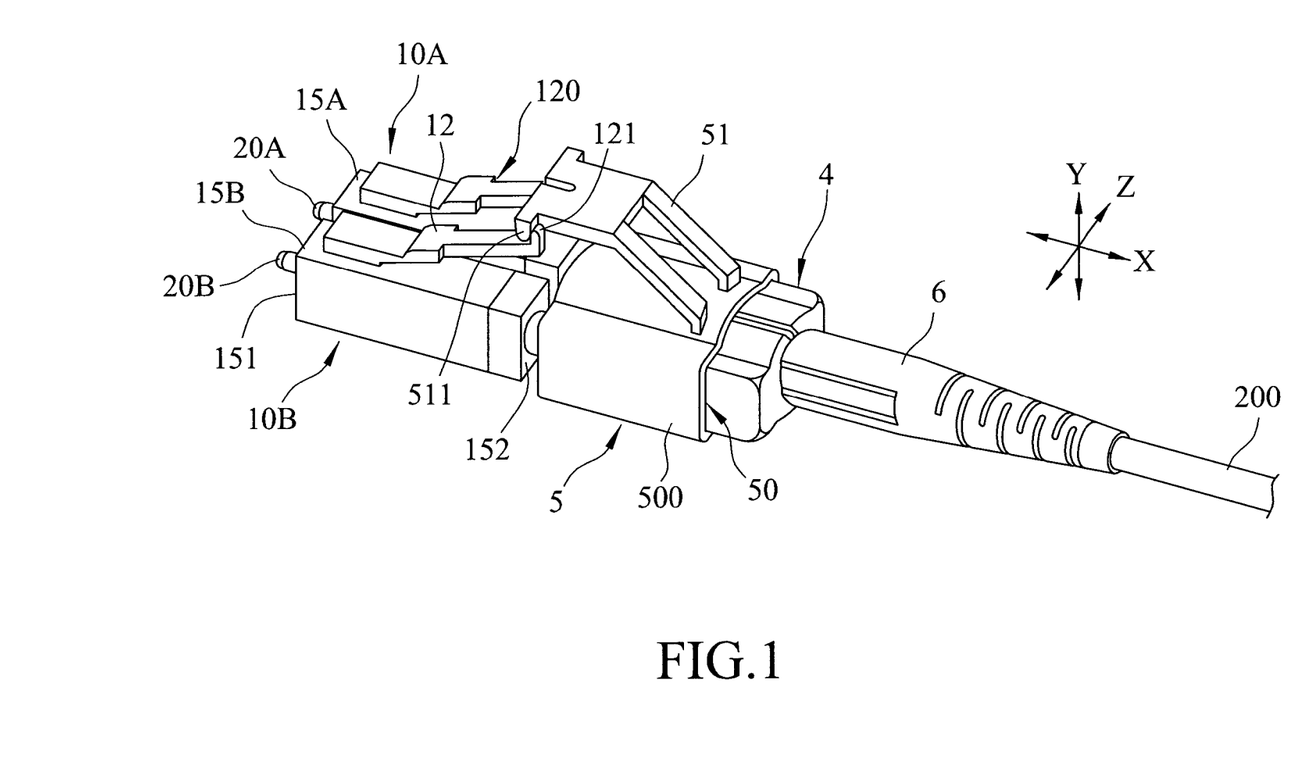
FIG. 1 is a perspective view of the first preferred embodiment of an optical fiber connector according to the present invention.
Figure 2:
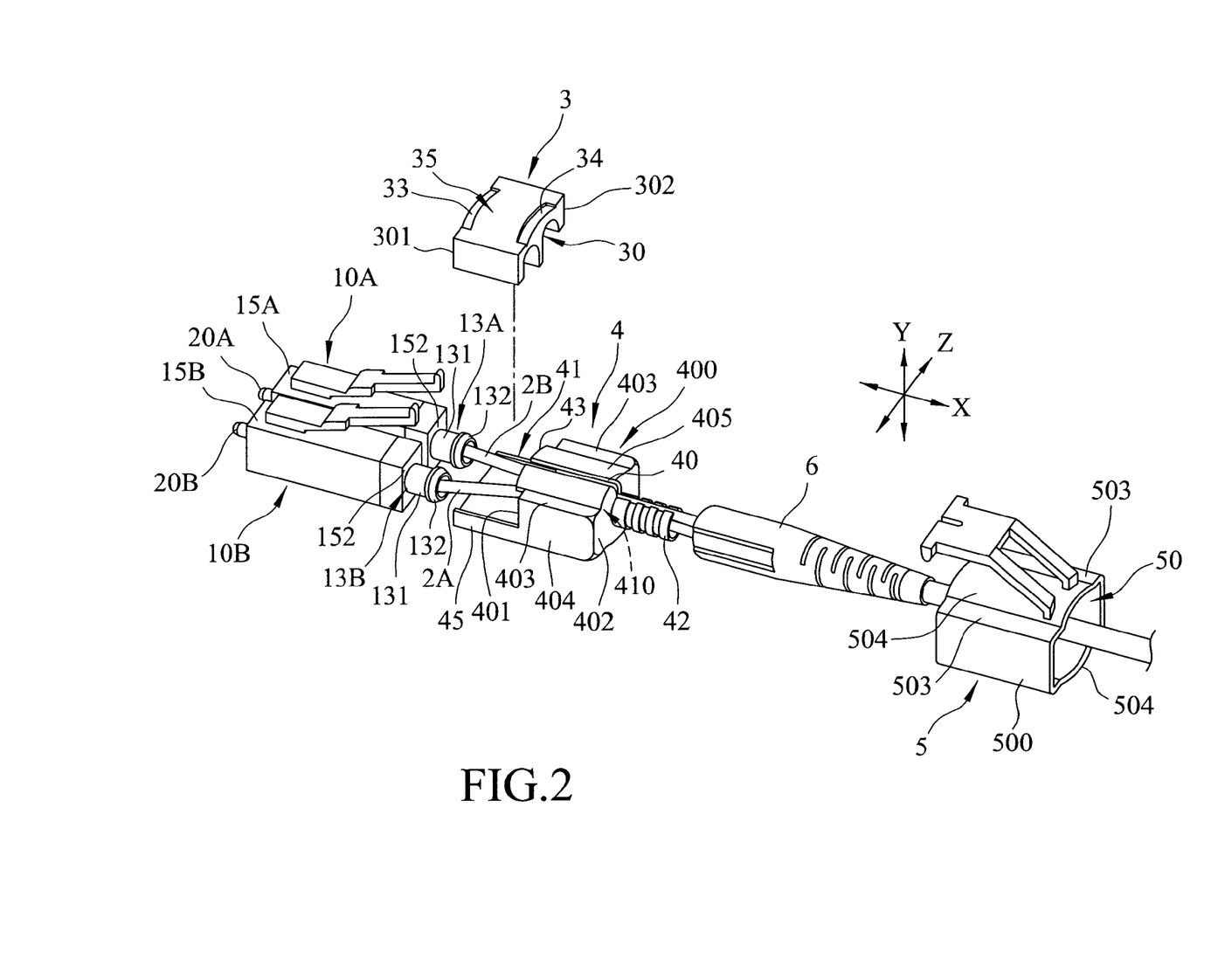
FIG. 2 is an exploded perspective view illustrating a state where a positioning cover is removed from a positioning housing of the first preferred embodiment.
Figure 3:
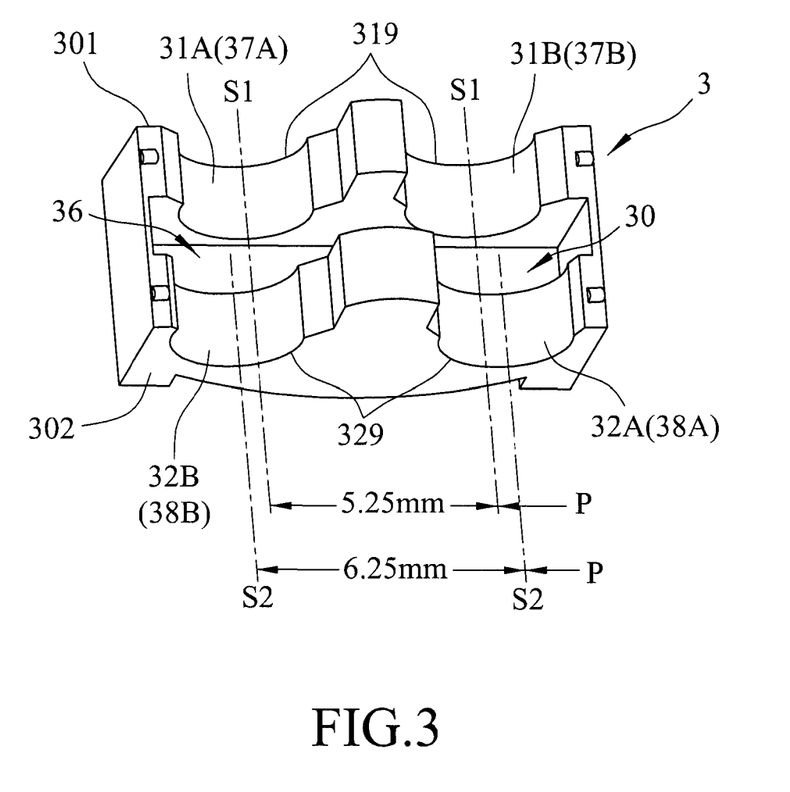
FIG. 3 is a perspective view of the positioning cover of the first preferred embodiment.

FIGS. 1 to 3 illustrate the first preferred embodiment of an (multi-fiber) optical fiber connector according to the present invention.

The optical fiber connector is adapted to be connected to at least two optical fibers 2A, 2B of a fiber optic cable 200 and an adapter of an equipment (not shown), such as a work station, and includes a positioning housing 4, a positioning cover 3, a tightening sleeve 5, and at least two terminal plugs 10A, 10B. A boot 6 is secured to the fiber optic cable 200.

The positioning housing 4 is for the optical fibers 2A, 2B to extend therethrough, and has a hollow block body 400 that has first and second axial ends 401, 402, an extension wall 45 that extends in an axial direction (X) from the first axial end 401 of the block body 400 toward the terminal plugs 10A, 10B, and that cooperates with the first axial end 401 to define a recessed open end 41, and a tubular tail 42 that extends in the axial direction (X) from the second axial end 402 of the block body 400 toward the boot 6. The boot 6 is sleeved on the tubular tail 42. In this embodiment, the recessed open end 41 has a generally L-shaped structure.

The positioning cover 3 has first and second axial ends 301, 302, an inner side 30, and an outer side 35 opposite to the inner side 30 in a vertical direction (Y) that is transverse to the axial direction (X). The inner side 30 extends between the first and second axial ends 301, 302 of the positioning cover 3, and is formed with at least two first grooves 31A, 31B and at least two second grooves 32A, 32B for positioning and extension of the optical fibers 2A, 2B therein. The first and second axial ends 301, 302 of the positioning cover 3 are opposite to each other in the axial direction (X). The first grooves 31A, 31B are aligned with each other along a transverse direction (Z) transverse to the axial direction (X) and the vertical direction (Y). The second grooves 32A, 32B are aligned with each other along the transverse direction (Y). Each of the first grooves 31A, 31B is spaced apart from and partially overlaps a corresponding one of the second grooves 32A, 32B along the axial direction (X).

Each of the terminal plugs 10A, 10B has a plug housing 15A, 15B for extension of a corresponding one of the optical fibers 2A, 2B therethrough, an optical ferrule 20A, 20B that protrudes from a first end 151 of the plug housing 15A, 15B in the axial direction (X) and that is connected to the corresponding one of the optical fibers 2A, 2B, and an end sleeve 13A, 13B that is disposed opposite to the optical ferrule 20A, 20B in the axial direction (X) and that extends from a second end 152 of the plug housing 15A, 15B in the axial direction (X) away from the optical ferrule 20A, 20B for extension of the corresponding one of the optical fibers 2A, 2B therethrough. In this embodiment, the plug housings 15A, 15B of the terminal plugs 10A, 10B are rectangular cuboids in shape.

The positioning cover 3 is detachably mountable on the positioning housing 4 between first and second positions (see FIGS. 4 and 5) relative to the positioning housing 4 to cover the recessed open end 41 of the positioning housing 4. When the positioning cover 3 is disposed at the first position, the first grooves 31A, 31B are respectively disposed between the plug housings 15A, 15B of the terminal plugs 10A, 10B and the second grooves 32A, 32B along the axial direction (X) and the end sleeves 13A, 13B are respectively fitted into the first grooves 31A, 31B (see FIG. 6). When the positioning cover 3 is disposed at the second position, the second grooves 32A, 32B are respectively disposed between the plug housings 15A, 15B and the first grooves 31A, 31B along the axial direction (X) and the end sleeves 13A, 13B are respectively fitted into the second grooves 32A, 32B (see FIG. 7).

In this embodiment, the inner side 30 of the positioning cover 3 is further formed with a middle groove 36 that is disposed between and that separates the first grooves 31A, 31B and the second grooves 32A, 32B along the axial direction (X). The end sleeve 13A, 13B of each of the terminal plugs 10A, 10B has a tubular portion 131 that extends and that is reduced in dimension from the second end 152 of the plug housing 15A, 15B in the axial direction (X), and a head portion 132 that is connected to and enlarged in diameter from the tubular portion 131. The tubular portions 131 of the end sleeves 13A, 13B are respectively fitted into the first grooves 31A, 31B when the positioning cover is disposed at the first position, and are respectively fitted into the second grooves 32A, 32B when the positioning cover 3 is disposed at the second position. The head portions 132 of the end sleeves 13A, 13B extend into the middle groove 36 when the positioning cover 3 is disposed at the first and second positions (see FIGS. 6 and 7), thereby limiting axial movement of the terminal plugs 10A, 10B.

Figure 4:
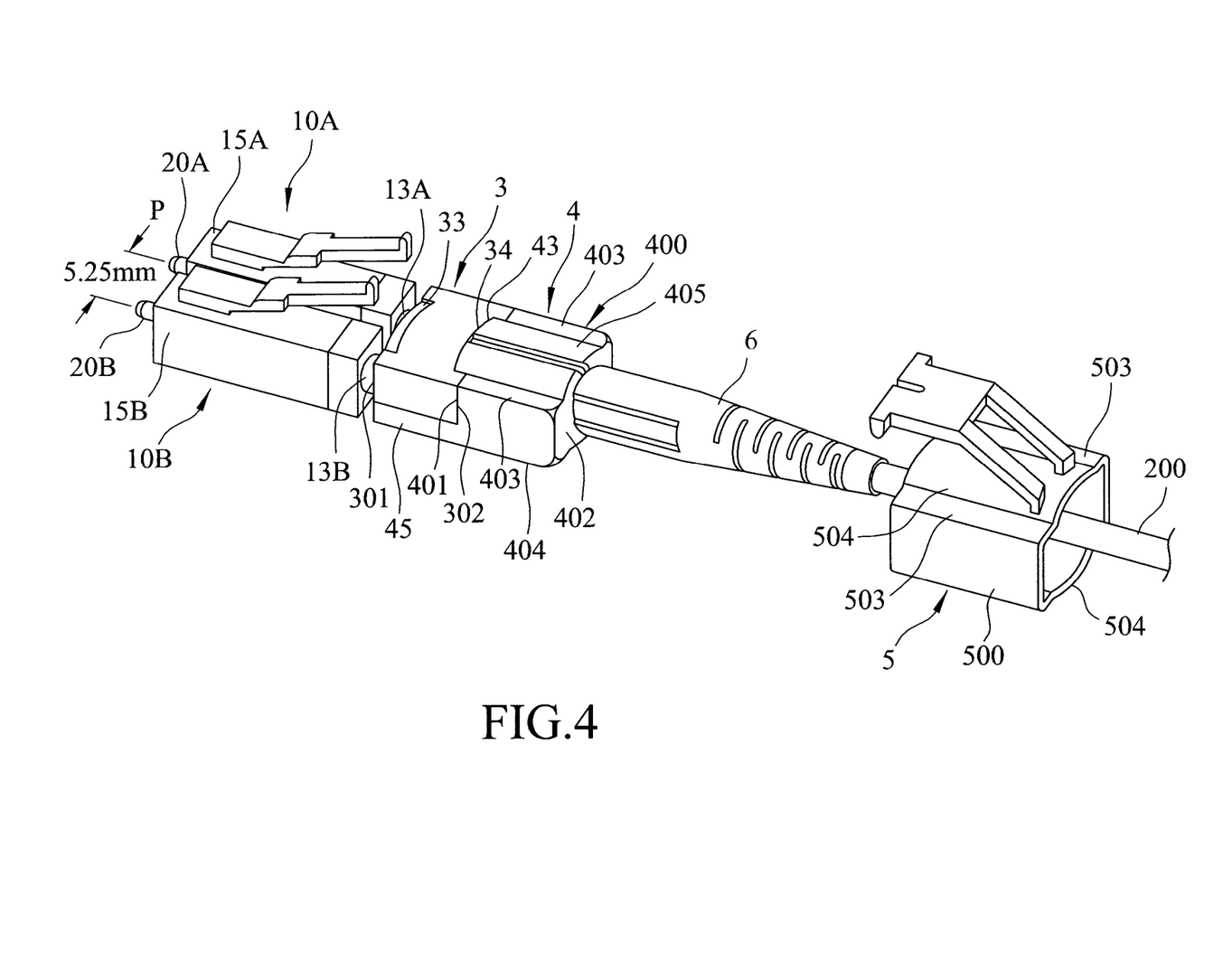
FIG. 4 is a perspective view illustrating a state where a tightening sleeve is removed from the positioning cover and the positioning housing of the first preferred embodiment and where the positioning cover is disposed at a first position.

The first axial end 301 of the positioning cover 3 is distal from the first axial end 401 of the block body 400 and the second axial end 302 of the positioning cover 3 covers and contacts the first axial end 401 of the block body 400 when the positioning cover 3 is disposed at the first position (see FIG. 4). The second axial end 302 of the positioning cover 3 is distal from the first axial end 401 of the block body 400 and the first axial end 301 of the positioning cover 3 covers and contacts the first axial end 401 of the block body 400 when the positioning cover 3 is disposed at the second position (see FIG. 5). The inner side 30 of the positioning cover 3 covers and contacts the extension wall 45 when the positioning cover 3 is disposed at the first and second positions.

The outer side 35 of the positioning cover 3 is formed with first and second recesses 33, 34 which extend axially and respectively from the first and second axial ends 301, 302 of the positioning cover 3, and toward each other. The block body 400 has two opposite U-shaped side walls 403 that are opposite to each other in the transverse direction (Z) and that extend from the first axial end 401 of the block body 400 to the second axial end 402 of the block body 400, an arc-shaped bottom wall 404 that is connected to the extension wall 45 in the axial direction (X) and that interconnects the U-shaped side walls 403, and an arc-shaped top wall 405 that extends from the first axial end 401 of the block body 400 to the second axial end 402 of the block body 400 and that interconnects the U-shaped side walls 403. The block body 400 is formed with a tongue 43 that protrudes from the first axial end 401 thereof toward the terminal plugs 10A, 10B. The tongue 43 is fitted into the second recess 34 when the positioning cover 3 is disposed at the first position (see FIG. 4), and is fitted into the first recess 33 when the positioning cover 3 is disposed at the second position (see FIG. 5). The block body 400 defines a positioning channel 410 therein for extension of the optical fibers 2A, 2B therethrough, and is further formed with an axial wall slit 40 that is in spatial communication with the positioning channel 410 and that extends through the top wall 405 and the tongue 43 of the block body 400 for allowing elastic deformation of the block body 400 in the transverse direction (Z).

The tightening sleeve 5 is slidably and tightly sleeved on the positioning housing 4 and the positioning cover 3 for securing the positioning cover 3 to the positioning housing 4 and for securing and maintaining axial and lateral alignment of the terminal plugs 10A, 10B through constriction of the positioning cover 3 and the block body 400 by an elastic force provided by the tightening sleeve 5. The tightening sleeve 5 has a closed loop-shaped frame body 500 that defines a frame space 50 for receiving the positioning housing 4 and the positioning cover 3 therein, and a spring pressing arm 51 that extends outwardly and inclinedly from the frame body 500 and that has a hooked end 511. Each of the terminal plugs 10A, 10B further has a spring latch arm 12 that extends outwardly and inclinedly from the plug housing 15A, 15B. The spring latch arm 12 of each of the terminal plugs 10A, 10B has a hooked end 121 that releasably engages the hooked end 511 of the spring pressing arm 51, and a middle shoulder 120 that is adapted to engage releasably the adapter of the work station (not shown) when the terminal plugs 10A, 10B are inserted into the slot in the adapter in a predetermined insertion direction. The spring pressing arm 51 abuts against the spring latch arms 12 of the terminal plugs 10A, 10B for manually pressing the latter to move downwardly to allow disengagement between the terminal plugs 10A, 10B and the adapter and removal of the terminal plugs 10A, 10B out of the slot. The frame body 500 has two opposite U-shaped side walls 503 and two opposite arc-shaped middle walls 504 that interconnect the U-shaped side walls 503 and that are opposite to each other in the vertical direction (Y). Each of the U-shaped side walls 403 of the block body 400 conforms to an adjacent one of the U-shaped side walls 503 of the frame body 500, and the arc-shaped top wall 405 of the block body 400 conforms to an adjacent one of the arc-shaped middle walls 504 of the frame body 500 when the tightening sleeve 5 is sleeved tightly on the positioning housing 4.

Each of the first grooves 31A, 31B is defined by a corresponding first U-shaped wall 37A, 37B. Each of the second grooves 32A, 32B is defined by a corresponding second U-shaped wall 38A, 38B. Each of the first and second U-shaped walls 37A, 37B, 38A, 38B has a semi-circular wall portion 319, 329. The semi-circular wall portions 319 of the first U-shaped walls 37A, 37B of the first grooves 31A, 31B respectively define first axes S1. The semi-circular wall portions 329 of the second U-shaped walls 38A, 38B of the second grooves 32A, 32B respectively define second axes S2 parallel to the first axes S1. The first axes S1 are disposed between and are spaced apart from the second axes S2 along the transverse direction (Z). The tubular portions 131 of the end sleeves 13A, 13B are respectively and coaxially disposed on the semi-circular wall portions 319 of the first U-shaped walls 37A, 37B when the positioning cover 3 is disposed at the first position. The tubular portions 131 of the end sleeves 13A, 13B are respectively and coaxially disposed on the semi-circular wall portions 329 of the second U-shaped walls 38A, 38B when the positioning cover 3 is disposed at the second position. When the positioning cover 3 is disposed at the first position, the first axes S1 respectively overlap axes of the terminal plugs 10A, 10B. When the positioning cover 3 is disposed at the second position, the second axes S2 respectively overlap the axes of the terminal plugs 10A, 10B.

Figure 6:
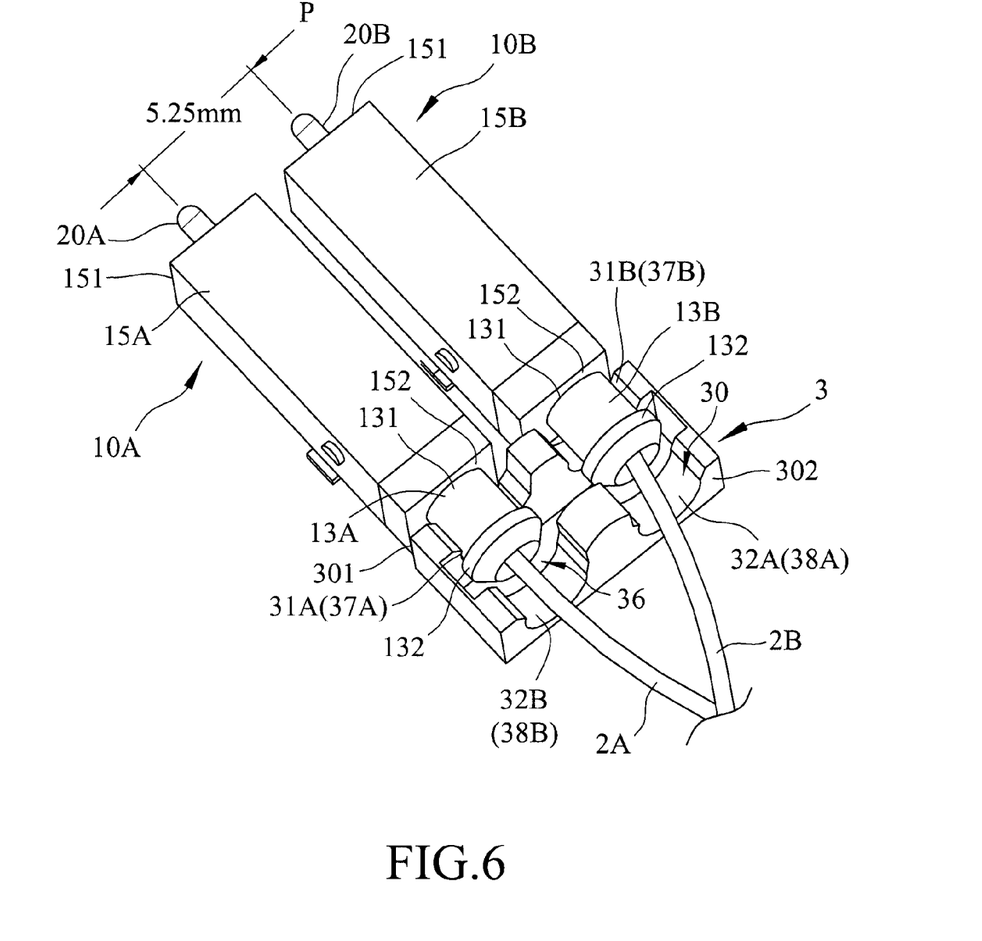
FIG. 6 is a perspective view illustrating a state where the positioning cover is disposed at the first position for receiving a pair of terminal plugs of the first preferred embodiment.
Figure 7:
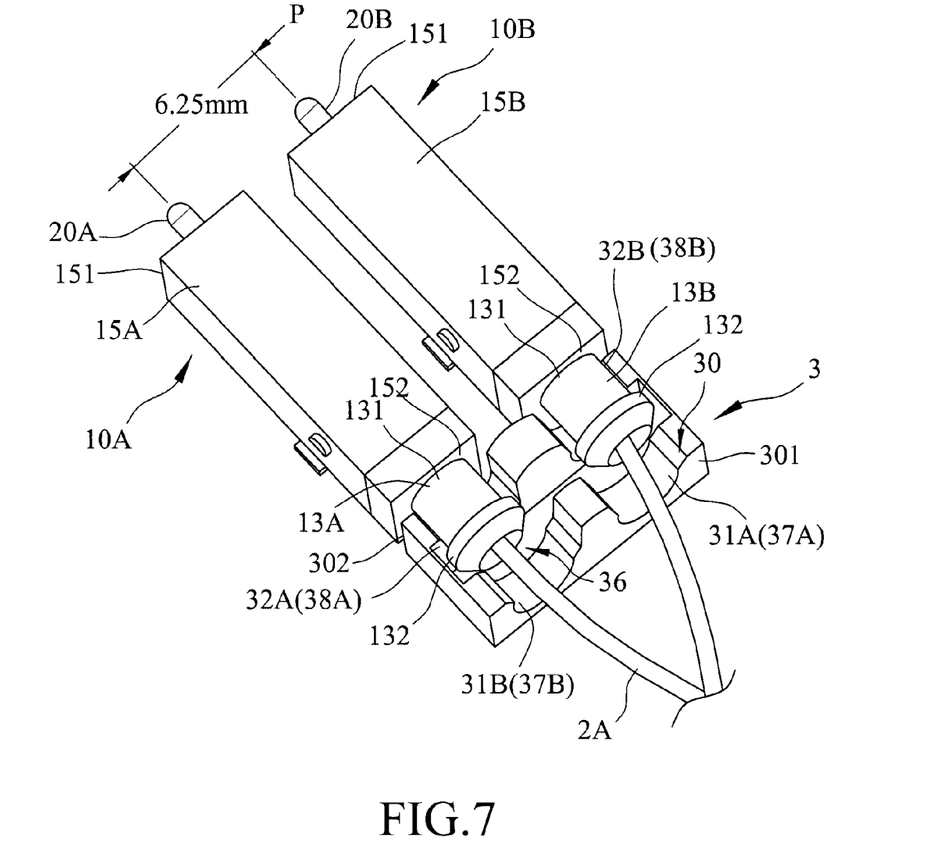
FIG. 7 is a perspective view illustrating another state where the positioning cover is disposed at the second position for receiving the pair of terminal plugs of the first preferred embodiment.
Figure 8:
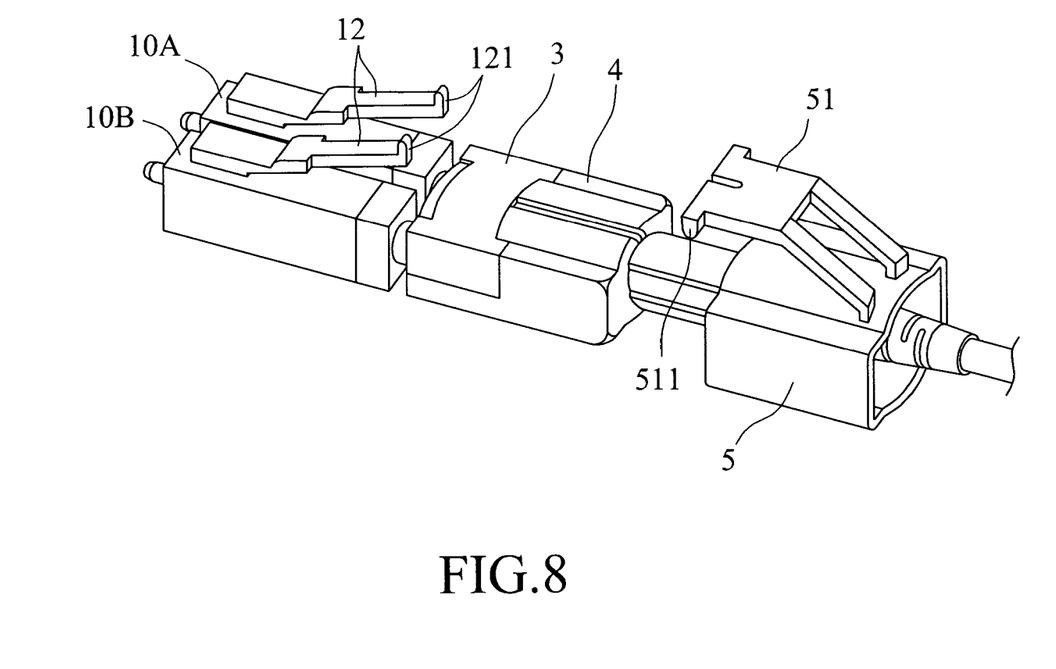
FIGS. 8 to 11 are perspective views illustrating consecutive steps of a process of performing polarity reversal of the terminal plugs of the first preferred embodiment.
Figure 9:
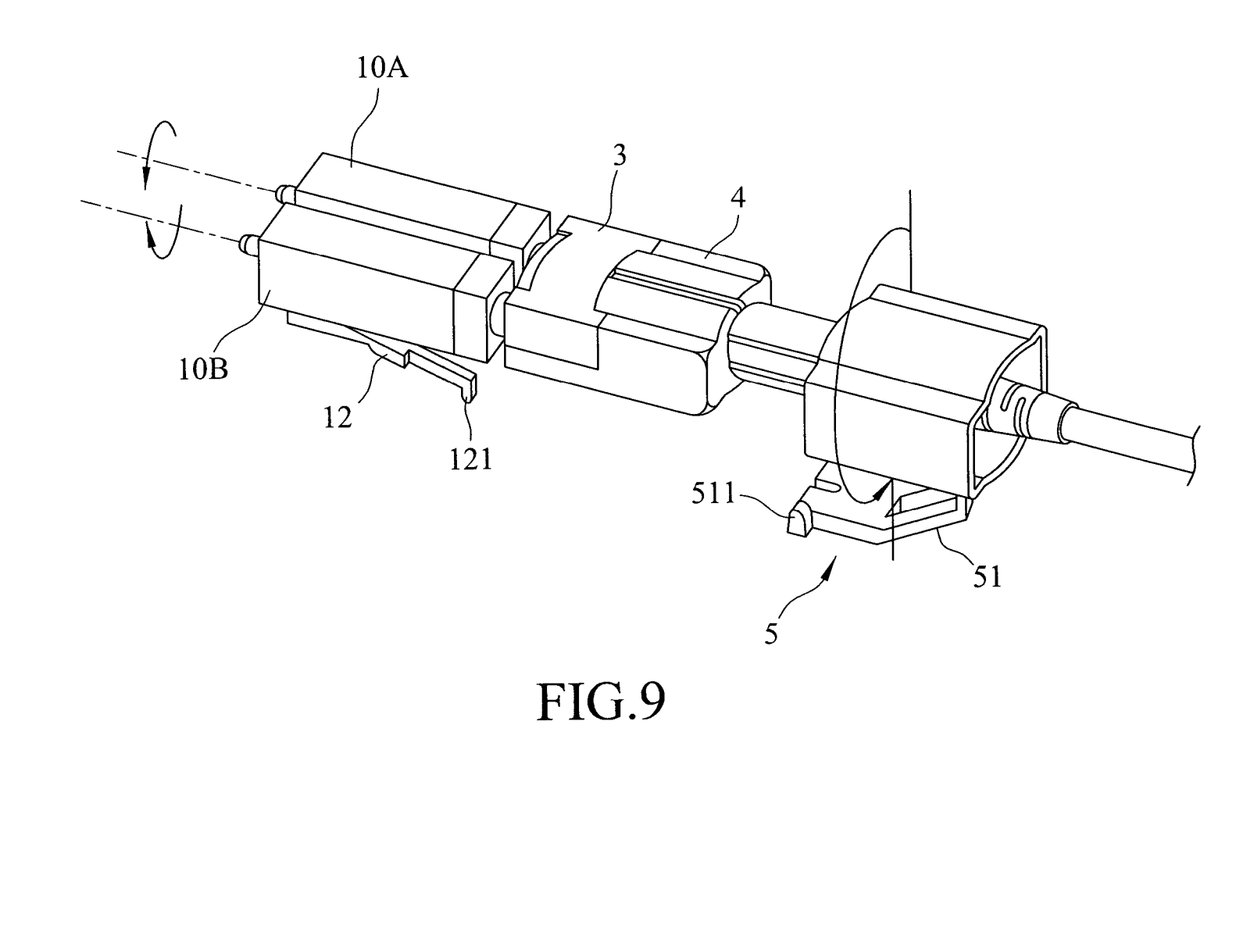
Figure 10:
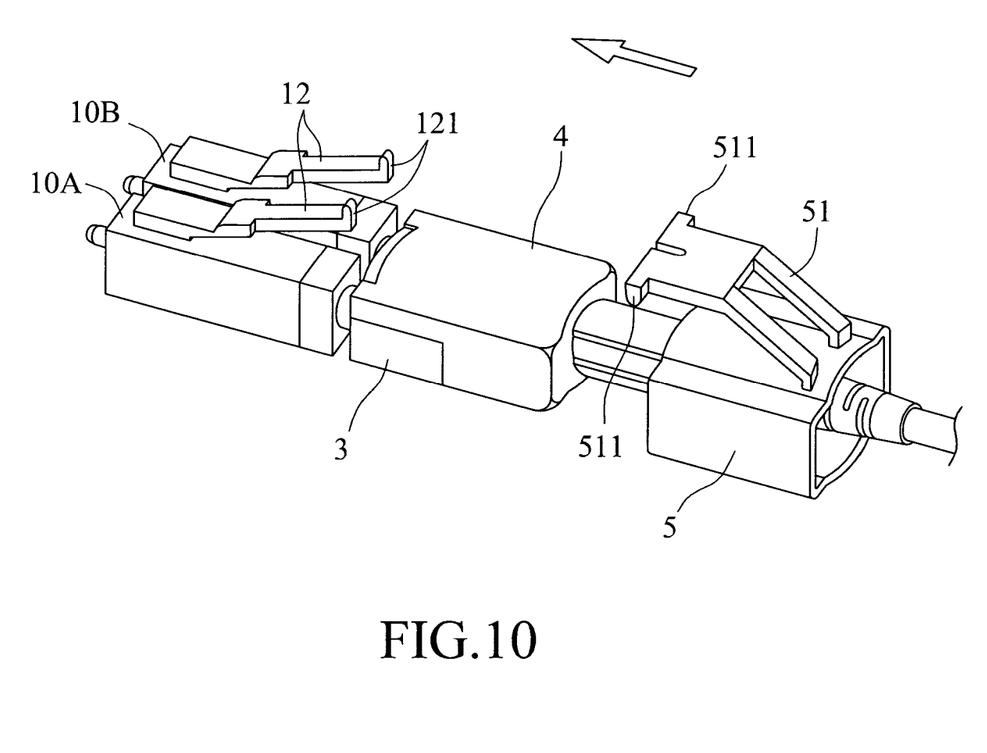
Figure 11:
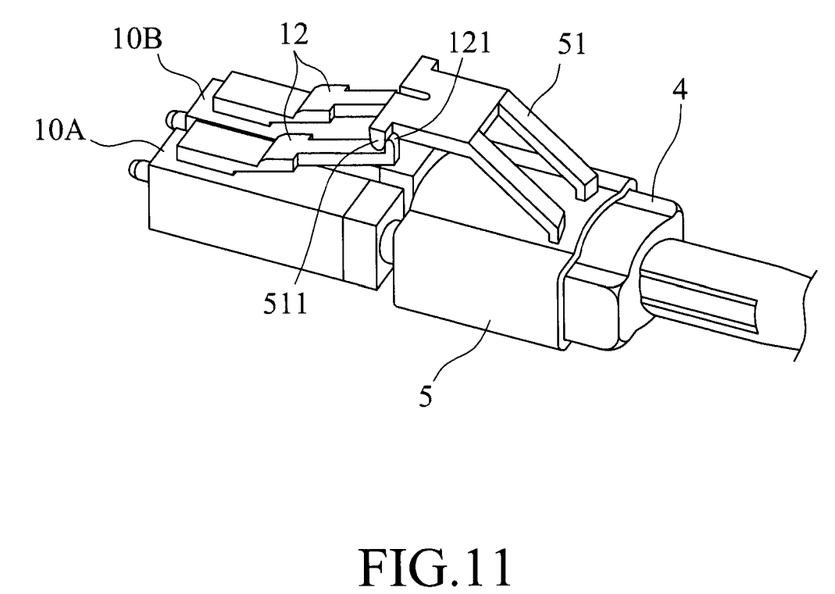

To change a pitch (P) between the axes of the terminal plugs 10A, 10B from 5.25 mm as shown in FIG. 6 to 6.25 mm as shown in FIG. 7, the spring latch arms 12 are disengaged from the spring pressing arm 51 first, followed by removing the tightening sleeve 5 from the positioning housing 4 and the positioning cover 3, removing the positioning cover 3 from the positioning housing 4, re-mounting the positioning cover 3 on the position housing 4 such that the positioning cover 3 is disposed at the second position, re-tightening the positioning housing 4 and the positioning cover 3 with the tightening sleeve 5, and re-engaging the spring latch arms 12 with the spring pressing arm 51.

The terminal plugs 10A, 10B are rotatable relative to the positioning housing 4 when the positioning cover 3 is positioned at the first and second positions, thereby permitting polarity reversal of the terminal plugs 10A, 10B.

Figure 5:
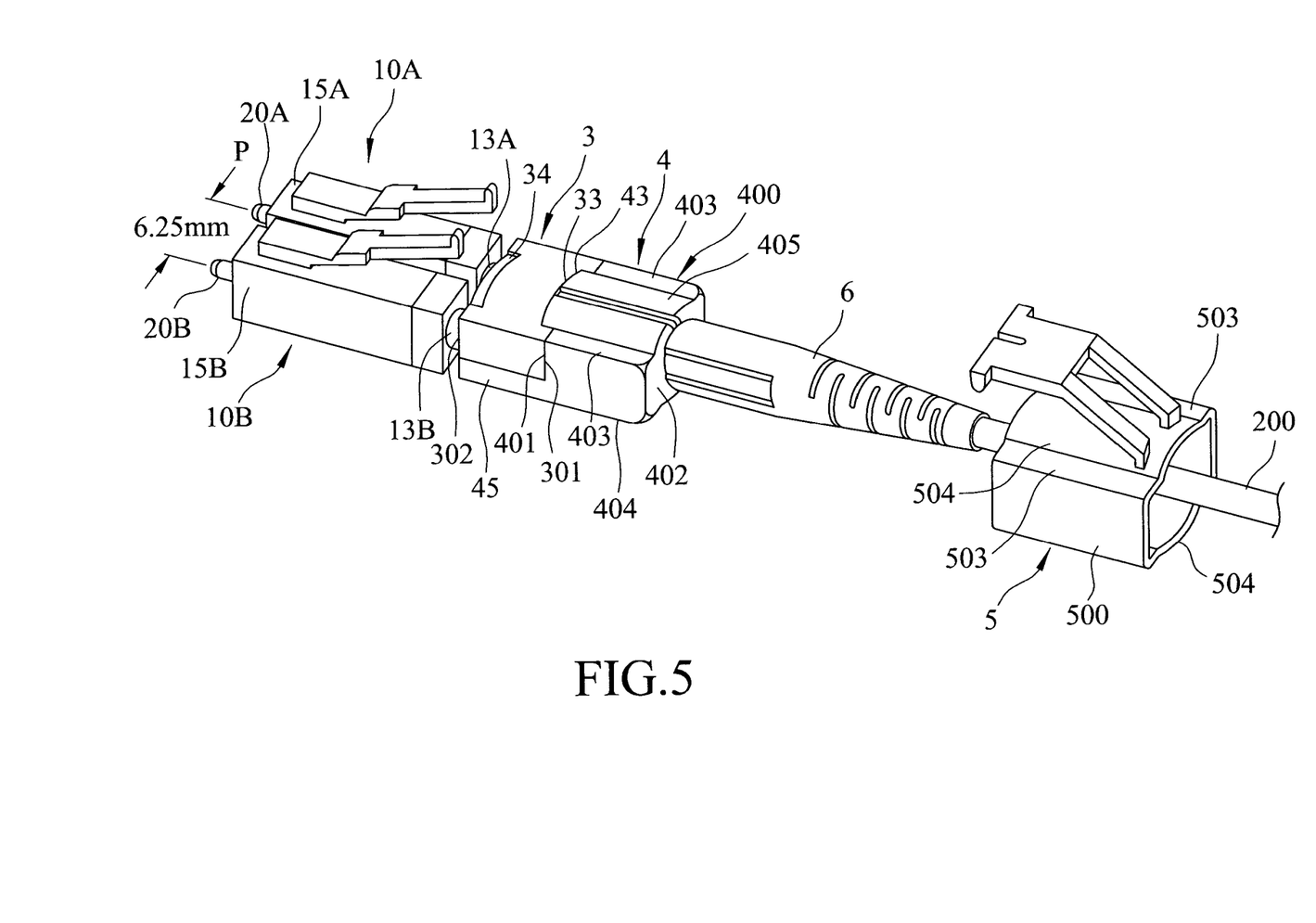
FIG. 5 is a perspective view illustrating another state where the positioning cover of the first preferred embodiment is disposed at a second position.

FIGS. 8 to 11 illustrate consecutive steps of a process of performing the polarity reversal of the terminal plugs 10A, 10B which carry the optical fibers 2A, 2B (see FIGS. 2 and 5). In operation, the spring latch arms 12 are disengaged from the spring pressing arm 51 first, followed by removing the tightening sleeve 5 from the positioning housing 4 and the positioning cover 3 (see FIG. 8), rotating each of the tightening sleeve 5 and the terminal plugs 10A, 10B by 180 degrees relative to the positioning housing 4 and the positioning cover 3 (see FIG. 9), rotating the optical fiber connector by 180 degrees (see FIG. 10) so that the spring latch arms 12 and the spring pressing arm 51 face upwardly (the predetermined insertion direction for allowing subsequent insertion of the terminal plugs 10A, 10B into the slot in the adapter) and that the positioning cover 3 faces downwardly, re-tightening the positioning housing 4 and the positioning cover 3 with the tightening sleeve 5 (see FIG. 11), and re-engaging the spring latch arms 12 with the spring pressing arm 51 (see FIG. 11). Alternatively, the optical fiber connector may be rotated by 180 degrees after the tightening of the positioning housing 4 and the positioning cover 3 with the tightening sleeve 5 and/or after the engagement between the spring latch arms 12 and the spring pressing arm 51.

Figure 12:
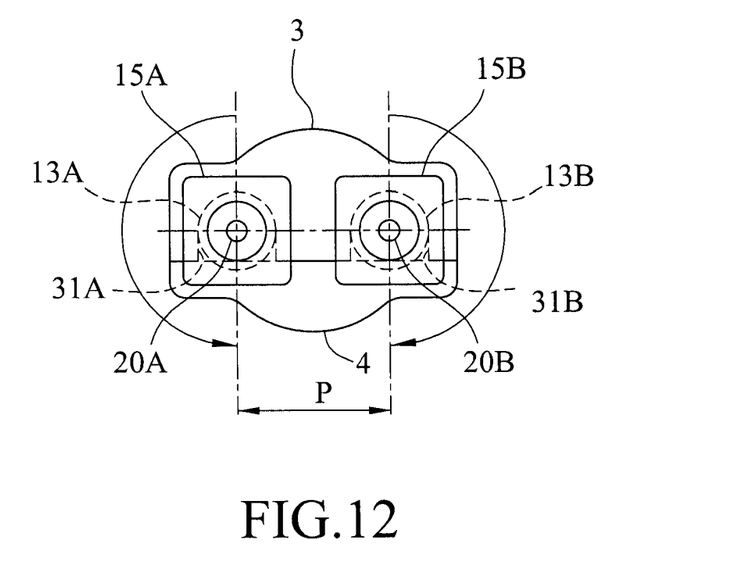
FIGS. 12 and 13 are schematic views illustrating consecutive steps of performing simultaneous rotation of the terminal plugs of the first preferred embodiment.
Figure 13:
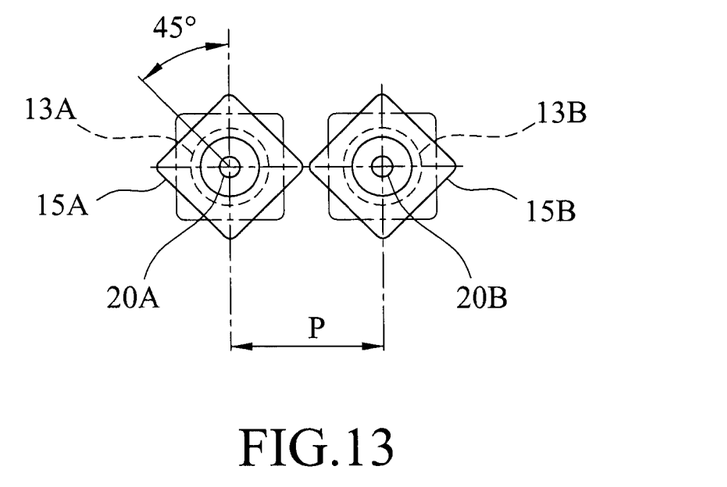

Referring to FIGS. 12 and 13, the plug housings 15A, 15B have the same structure, and each of the plug housings 15A, 15B has a square periphery with a diagonal distance (or a maximum width) and four sides that have a side length, such that the pitch (P) between the axes of the plug housings 15A, 15B is at least greater than the summation of a half of the diagonal distance and a half of the side length, thereby preventing interference between the plug housings 15A, 15B when each plug housing 15A, 15B is rotated 180 degrees relative to the positioning housing 4 from a first polarity configuration (see FIG. 12) to a second polarity configuration (not shown). It is noted that the plug housings 15A, 15B may be rotated 180 degrees relative to the positioning housing 4 one after the other or simultaneously. To facilitate simultaneous rotations of the plug housings 15A, 15B relative to the positioning housing 4, the pitch (P) between the axes of the plug housings 15A, 15B is at least greater than the diagonal distance of the square periphery of the plug housing 15A, 15B (see FIG. 13 when the plug housings 15A, 15B are both rotated by 45 degrees).

Figure 14:
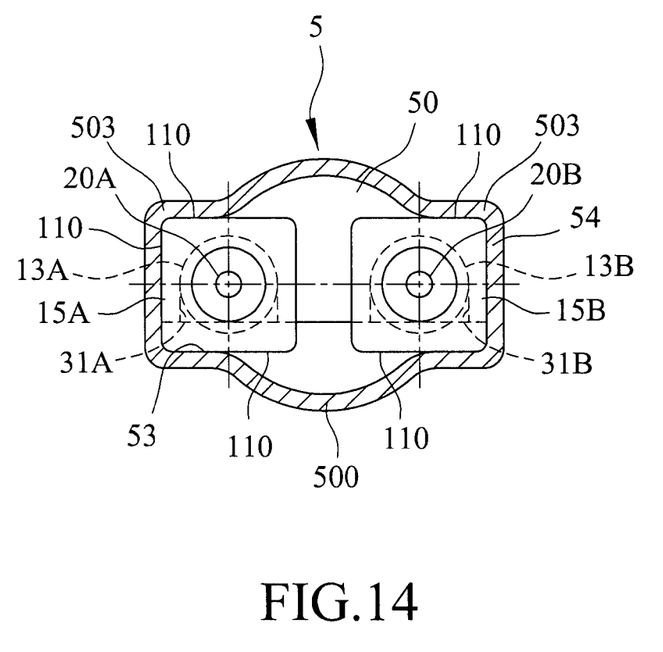
FIG. 14 is a schematic sectional view of the second preferred embodiment of the optical fiber connector according to the present invention.

FIG. 14 illustrates the second preferred embodiment of the optical fiber connector according to the present invention. The second preferred embodiment differs from the previous embodiment in that the U-shaped side walls 503 of the frame body 500 of the tightening sleeve 5 are further tightly and releasably fitted on the plug housings 15A, 15B, respectively, in addition to being sleeved on the positioning housing 4 (see FIG. 2) and the positioning cover 3 (see FIG. 2), when the positioning cover 3 is disposed at the second position.

With the inclusion of the positioning housing 4 and the positioning cover 3 in the optical fiber connector of this invention and by forming the first grooves 31A, 31B and the second grooves 32A, 32B in the positioning cover 3, the aforesaid drawback associated with the prior art may be eliminated.

While the present invention has been described in connection with that are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An optical fiber connector adapted to be connected to at least two optical fibers, said optical fiber connector comprising:
    a positioning housing for extension of the optical fibers therethrough and having a recessed open end;
    a positioning cover having first and second axial ends and an inner side that extends between said first and second axial ends and that is formed with at least two first grooves and at least two second grooves for positioning and extension of the optical fibers therein, said first and second axial ends being opposite to each other in an axial direction, said first grooves being aligned with each other along a transverse direction transverse to said axial direction, said second grooves being aligned with each other along said transverse direction, each of said first grooves being spaced apart from and partially overlapping a corresponding one of said second grooves along said axial direction; and
    at least two terminal plugs, each of which has a plug housing and an end sleeve connected to said plug housing in said axial direction for sequential extension of a corresponding one of the optical fibers therethrough;
    wherein said positioning cover is detachably mountable on said positioning housing between first and second positions relative to said positioning housing to cover said recessed open end of said positioning housing;
    wherein when said positioning cover is disposed at said first position, said first grooves are respectively disposed between said plug housings of said terminal plugs and said second grooves along said axial direction and said end sleeves of said terminal plugs are respectively fitted into said first grooves; and
    wherein when said positioning cover is disposed at said second position, said second grooves are respectively disposed between said plug housings and said first grooves along said axial direction and said end sleeves are respectively fitted into said second grooves.

2. The optical fiber connector of claim 1, wherein said inner side of said positioning cover is further formed with a middle groove that is disposed between said first grooves and said second grooves along said axial direction, each of said end sleeves having a tubular portion that extends from said plug housing in said axial direction toward said positioning housing, and a head portion that is enlarged in diameter from said tubular portion and that is distal from said plug housing, said tubular portions of said end sleeves being respectively fitted into said first grooves when said positioning cover is disposed at said first position, and being respectively fitted into said second grooves when said positioning cover is disposed at said second position, said head portions of said end sleeves extending into said middle groove when said positioning cover is disposed at said first and second positions.

3. The optical fiber connector of claim 1, wherein said positioning housing has a hollow block body that has an axial end, and an extension wall that extends in said axial direction from said axial end toward said terminal plugs and that cooperates with said axial end to define said recessed open end of said positioning housing, said recessed open end having a generally L-shaped structure, said second axial end of said positioning cover covering and contacting said axial end of said block body when said positioning cover is disposed at said first position, said first axial end of said positioning cover covering and contacting said axial end of said block body when said positioning cover is disposed at said second position, said inner side of said positioning cover covering and contacting said extension wall when said positioning cover is disposed at said first and second positions.

4. The optical fiber connector of claim 3, wherein said positioning cover further has an outer side that is opposite to said inner side in a vertical direction and that is formed with first and second recesses which extend along said axial direction respectively from said first and second axial ends of said positioning cover and toward each other, said vertical direction being transverse to said axial direction and said transverse direction, said block body being formed with a tongue that protrudes along said axial direction from said axial end of said block body toward said terminal plugs, said tongue being fitted into said second recess when said positioning cover is disposed at said first position, and being fitted into said first recess when said positioning cover is disposed at said second position.

5. The optical fiber connector of claim 3, wherein said block body defines a positioning channel therein for extension of the optical fibers therethrough, and is formed with an axial wall slit that is in spatial communication with said positioning channel for allowing elastic deformation of said block body in said transverse direction.

6. The optical fiber connector of claim 5, further comprising a tightening sleeve that is slidably and tightly sleeved on said positioning housing and said positioning cover for securing said positioning cover to said positioning housing.

7. The optical fiber connector of claim 6, wherein said tightening sleeve has a frame body and a spring pressing arm that extends outwardly from said frame body, each of said terminal plugs further having a spring latch arm that extends outwardly from said plug housing and that releasably engages said spring pressing arm.

8. The optical fiber connector of claim 1, wherein each of said first grooves is defined by a first U-shaped wall, each of said second grooves being defined by a second U-shaped wall, each of said first and second U-shaped walls having a semi-circular wall portion, said semi-circular wall portions of said first U-shaped walls respectively defining first axes, said semi-circular wall portions of said second U-shaped walls respectively defining second axes, said first axes being disposed between and being spaced apart from said second axes along said transverse direction.

9. The optical fiber connector of claim 1, wherein said terminal plugs are rotatable relative to said positioning housing when said positioning cover is positioned at said first and second positions, thereby permitting reversal of said terminal plugs.

10. The optical fiber connector of claim 7, wherein said block body has two U-shaped side walls that are opposite to each other in said transverse direction and an arc-shaped top wall that interconnects said U-shaped side walls, said frame body having two U-shaped side walls that are opposite to each other in said transverse direction, and two arc-shaped middle walls that interconnect said U-shaped side walls of said frame body and that are opposite to each other in a vertical direction transverse to said axial direction and said transverse direction, each of said U-shaped side walls of said block body conforming to an adjacent one of said U-shaped side walls of said frame body and said arc-shaped top wall of said block body conforming to an adjacent one of said arc-shaped middle walls of said frame body when said tightening sleeve is sleeved tightly on said positioning housing.

11. The optical fiber connector of claim 10, wherein said U-shaped side walls of said frame body are tightly and releasably fitted on said plug housings, respectively, when said positioning cover is disposed at said second position.

\* \* \* \* \*

UNITED STATES PATENT AND TRADEMARK OFFICE
CERTIFICATE OF CORRECTION

PATENT NO. : 9,465,172 B2
APPLICATION NO. : 14/253121
DATED : October 11, 2016
INVENTOR(S) : Hsi-Chung Shih

Page 1 of 1

It is certified that error appears in the above-identified patent and that said Letters Patent is hereby corrected as shown below:

On the Title Page

Please add:
[30] Foreign Priority Application Data
Sept. 27, 2013 (TW) 102218302

Signed and Sealed this
Eleventh Day of April, 2017

Michelle K. Lee
*Director of the United States Patent and Trademark Office*